United States Patent [19]

Kokayeff et al.

[11] Patent Number: 4,923,836

[45] Date of Patent: May 8, 1990

[54] NI/CU ABSORBENT/CATALYST FOR DESULFURIZATION AND ISOMERIZATION OF N-PARAFFINS

[75] Inventors: Peter Kokayeff, Fullerton; Suheil F. Abdo, Diamond Bar, both of Calif.

[73] Assignee: Union Oil Company of California, Los Angeles, Calif.

[21] Appl. No.: 413,396

[22] Filed: Sep. 27, 1989

Related U.S. Application Data

[60] Division of Ser. No. 238,779, Aug. 31, 1988, Pat. No. 4,886,935, which is a continuation-in-part of Ser. No. 74,294, Jul. 16, 1987, Pat. No. 4,827,076.

[51] Int. Cl.$^5$ .............................................. B01J 29/14
[52] U.S. Cl. .......................................... 502/74; 502/79; 502/84; 502/331
[58] Field of Search .................... 208/111; 502/64, 79, 502/84, 331, 74

[56] References Cited

U.S. PATENT DOCUMENTS

| | | | |
|---|---|---|---|
| 2,755,226 | 7/1956 | Annable | 196/28 |
| 2,951,888 | 9/1960 | Carr | 260/683.65 |
| 3,013,985 | 12/1961 | Breck et al. | 502/79 |
| 3,076,858 | 2/1963 | Frevel et al. | 502/331 |
| 3,206,414 | 9/1965 | Gunther | 502/331 |
| 3,236,761 | 2/1966 | Rabo et al. | 208/111 |
| 3,236,762 | 2/1966 | Rabo et al. | 208/111 |
| 3,271,324 | 9/1966 | Stephens et al. | 502/331 |
| 3,346,328 | 10/1967 | Sergeys et al. | 502/79 |
| 3,354,077 | 11/1967 | Hansford | 208/111 |
| 3,497,462 | 2/1970 | Kruerke | 502/331 |
| 3,649,176 | 3/1972 | Rosback | 208/310 |
| 3,677,972 | 7/1972 | Gutberlet et al. | 252/455 Z |
| 3,706,815 | 12/0019 | Alley, Jr. | 260/683.65 |
| 3,907,666 | 9/1975 | Chun et al. | 502/331 |
| 3,925,503 | 12/1975 | Parthasarathy | 260/683.65 |
| 3,929,672 | 12/1975 | Ward | 252/455 Z |
| 4,006,105 | 2/1977 | Fedor et al. | 502/313 |
| 4,022,684 | 5/1977 | Glack et al. | 208/111 |
| 4,097,365 | 6/1978 | Ward | 208/111 |
| 4,115,849 | 9/1978 | Fedor | 502/315 |
| 4,146,462 | 3/1979 | Rustamov et al. | 208/46 |
| 4,151,121 | 4/1979 | Gladrow | 502/79 |
| 4,163,708 | 8/1979 | Jacobson et al. | 208/89 |
| 4,182,692 | 1/1980 | Kiovsky et al. | 252/455 Z |
| 4,204,947 | 5/1980 | Jacobson et al. | 208/243 |
| 4,224,191 | 9/1980 | Bishop, III | 252/463 |
| 4,232,181 | 11/1980 | Kiovsky et al. | 585/739 |
| 4,238,319 | 12/1980 | Hauschildt et al. | 208/138 |
| 4,246,094 | 1/1981 | McCaulay et al. | 208/57 |
| 4,275,257 | 6/1981 | Hutson, Jr. | 585/738 |
| 4,336,130 | 6/1982 | Miller et al. | 208/243 |
| 4,374,296 | 2/1983 | Haag et al. | 585/739 |
| 4,376,699 | 3/1983 | Gardner | 208/115 |
| 4,419,224 | 12/1983 | Miller et al. | 208/244 |
| 4,433,190 | 2/1984 | Sikkenga et al. | 585/660 |
| 4,442,221 | 4/1984 | Bishop, III et al. | 502/25 |
| 4,457,832 | 7/1984 | Robinson | 208/66 |
| 4,503,023 | 3/1985 | Breck et al. | 423/328 |
| 4,582,819 | 4/1986 | Miller et al. | 502/415 |
| 4,672,048 | 6/1987 | Ward | 502/66 |
| 4,695,366 | 9/1987 | Miller et al. | 208/91 |
| 4,711,773 | 12/1987 | Mesters et al. | 502/345 |
| 4,738,771 | 4/1988 | Miller et al. | 208/135 |
| 4,827,076 | 5/1989 | Kokayeff et al. | 585/739 |

OTHER PUBLICATIONS

Cartwright, C. W. and Stock, R. J., "BP Couples Isom and Mol Sieve Processes," *The Oil and Gas Journal*, pp. 141–145, Sep. 18, 1978.

"Hysomer and TIP System," *Hydrocarbon Processing*, p. 121, Sep., 1984.

Symoniak, M. F., Reber, R. A., and Victory, R. M., "Adsorption Makes Isom Better," *Hydrocarbon Processing*, pp. 101–104, May, 1973.

Symoniak, M. F., "Upgrade Naphtha to . . . Fuels and Feedstocks," *Hydrocarbon Processing*, pp. 110–114, May, 1980.

*Primary Examiner*—Anthony Mc Farlane
*Attorney, Agent, or Firm*—Alan H. Thompson; Gregory F. Wirzbicki

[57] ABSTRACT

A dual-function catalyst containing both Group VIII and Group IB metals which is effective for simultaneously absorbing sulfur and isomerizing a hydrocarbon feedstock.

21 Claims, No Drawings

NI/CU ABSORBENT/CATALYST FOR DESULFURIZATION AND ISOMERIZATION OF N-PARAFFINS

RELATED APPLICATIONS

This application is a division, of application Ser. No. 238,779, filed Aug. 31, 1988, now U.S. Pat. No. 4,886,935, which is a continuation-in-part application of application U.S. Ser. No. 074,294, filed Jul. 16, 1987, now U.S. Pat. No. 4,827,076.

BACKGROUND OF THE INVENTION

The invention relates to a desulfurization process and a catalytic isomerization process for hydrocarbons, particularly paraffin-containing hydrocarbon feedstreams.

Natural or straight run gasoline, i.e., naphthas, contain normal paraffins (n-paraffins) which have relatively low octane numbers. In the catalytic isomerization of paraffins, such as n-hexane and n-pentane, to equilibrium mixtures of branched chain isomers, the octane rating of the paraffins is substantially increased. Previous processes directed to paraffin isomerization have employed acid- promoted aluminum chloride catalysts, Y-type crystalline zeolite catalysts containing an elemental metal of Group VIII of the Periodic Table (U.S. Pat. Nos. 3,236,761 and 3,236,762), synthetic mordenite catalysts containing highly-dispersed platinum or palladium in the presence of hydrogen (U.S. Pat. Nos. 3,527,835 and 3,299,153), stabilized Y-sieve hydrogen zeolite compositions (U.S. Pat. No. 3,354,077), and the like. Commonly used commercial isomerization catalysts contain significant proportions of relatively expensive platinum or palladium metal components.

The hydrocarbon feedstream to an isomerization reactor is generally treated (hydrotreated) to remove sulfur and nitrogen compounds that rapidly deactivate (even poison) the relatively expensive isomerization catalyst. A common method of treating the feedstream to reduce the sulfur content is by hydrodesulfurization wherein the feed is contacted with a sulfur-tolerant hydrogenation catalyst in the presence of hydrogen. Although good sulfur removal may be achieved with hydrodesulfurization units operating under severe conditions, the efficiency of such units is ultimately limited by equilibrium and/or kinetic considerations and further desulfurization is often necessary in downstream processes.

Downstream processes employing relatively inexpensive, catalytically active materials further reduce the sulfur content of a hydrocarbon by "absorbing" sulfur therefrom under either hydrogenative or nonhydrogenative conditions. The absorbent material may contain a metal component, such as nickel, copper, or silver, and the feedstocks generally treated are reformer feedstocks, particularly naphthas. Typical of such processes is that disclosed in U.S. Pat. No. 2,755,226 to Annable wherein a bed of copper molybdate pellets is used to reduce the sulfur content of naphthas. Similarly, in U.S. Pat. No. 4,224,191 to Bishop III, U.S. Pat. No. 4,204,947 to Jacobson et al. and U.S. Pat. No. 4,582,819 to Miller, the use of copper components supported on conventional carriers is disclosed for reducing the sulfur content of reformer feedstreams. Also, processes disclosed in U.S. Pat. No. 4,419,224 to Miller include reducing the sulfur content of reformer feedstreams with promoted nickel components on alumina carriers.

OBJECTS OF THE INVENTION

Reformer feedstreams typically contain substantial proportions of hydrocarbons boiling at a temperature higher than that of n-hexane. When the sulfur content of feedstreams containing substantial proportions of lighter hydrocarbons, such as n-hexane and n-pentane, is too large, appreciable loss in a catalyst's n-pentane and n-hexane isomerization activity is observed. In the present invention, it has been discovered that the isomerization activity of relatively expensive isomerization catalysts may be improved substantially by reducing the sulfur content in the isomerization feed to below 5 ppmw, more particularly below 2 ppmw, and most particularly below 1 ppmw. Such improved activity allows a petroleum refiner to operate at milder conditions and expend less energy to produce the desired isomerized products.

Accordingly, it is an object of the invention to reduce the concentration of sulfur in a hydrocarbon feedstream to be contacted with an isomerization catalyst, particularly a catalyst useful for isomerizing feedstreams containing a substantial proportion of normal paraffins, such as n-hexane and/or n-pentane, to levels at which the activity of the catalyst is significantly improved.

Furthermore, in addition to protecting the isomerization catalyst from sulfur poisoning, the petroleum refiner may also desire an increase in the capacity of an isomerization unit. Therefore, another objective of the present invention is to simultaneously reduce the sulfur concentration and isomerize n-paraffins.

SUMMARY OF THE INVENTION

The invention relates to a process wherein a paraffin-containing feedstock is isomerized (or hydroisomerized) by contact with a novel dual-function catalyst capable of simultaneously absorbing sulfur components from the feedstock and isomerizing normal paraffins in either the presence or absence of sulfur in the feedstock. The dual-function catalyst contains at least one Group VIII metal component and at least one Group IB metal component in combination with an acidic support component. Although the dual-function catalyst is active for isomerization (or hydroisomerization) in the presence of sulfur in the feedstock, such activity is better when less than 5 ppmw, and preferably no sulfur is present in the feedstock. Furthermore, it is highly preferred that the dual-function catalyst contain both nickel and copper metal components on the support, particularly when a highly stable dual-function catalyst is desired.

In a two-stage embodiment, organosulfur compounds are removed from a feedstock that is simultaneously isomerized (or hydroisomerized) in an upstream reaction zone by contact with the dual-function catalyst, or with the dual-function catalyst in combination with a catalytic absorbent, and subsequently further isomerized (or hydroisomerized) in a downstream reaction zone by contact with an isomerization (or hydroisomerization) catalyst under suitable conditions for producing an increased yield of branched-chain paraffins, such as pentane or hexane isomer compounds.

DETAILED DESCRIPTION OF THE INVENTION

The invention provides a process for reducing the sulfur content of a hydrocarbon feedstock containing n-paraffins to less than 5 ppmw, preferably less than 2 ppmw, and most preferably less than 1 ppmw, usually by contact with a dual-function catalyst active for simultaneously removing sulfur and isomerizing n-paraffins, or with the dual-function catalyst in combination with a catalytic absorbent. Such desulfurization occurs either prior to, or simultaneously with, contacting the oil with a catalyst useful for isomerizing n-pentane and/or n-hexane compounds.

It will be understood that, although the term "catalytic absorbent" is used herein to describe the material of the present invention with which the hydrocarbon feedstock is contacted, and the term "absorbed" is used to describe the mechanism by which the sulfur is held thereon, the invention embraces whatever mechanism, including adsorption, absorption, deposition, chemical reactions, etc., or some combinations of such mechanisms, by which the sulfur (in the form of organosulfur, hydrogen sulfide, and the like) is removed from the hydrocarbon feedstock and retained by the catalytic absorbent.

It will be further understood that the "catalytic absorbent" referred to herein, although useful for removing sulfur from hydrocarbon feedstocks, may also, in some embodiments of the invention, function as a "dual-function catalyst" for simultaneously promoting the removal of sulfur and the isomerization (or hydroisomerization) of feedstocks containing n-pentane and/or n-hexane.

THE FEEDSTOCK

The hydrocarbon feeds isomerized and/or desulfurized in the present invention include straight run petroleum distillates obtained from crude oil, hydrocracked feedstocks, coker products and the like. Examples include straight run naphthas, coker naphthas, hydrocracked naphthas, thermally cracked or catalytically cracked naphthas and blends thereof. The feedstock to the process may boil in the range from about 50° F. to about 200° F. and preferably entirely boils at temperatures less than about 175° F. The feedstock will usually comprise pentane and hexane predominantly in the forms of n-pentane and n-hexane. Usually the feedstock contains a mixture of at least 20, and typically at least about 35 weight percent n-pentane or n-hexane and may consist only of pentane and/or hexane. A highly preferred feedstock is a light gasoline fraction (i.e., boiling in the range from about 50° F. to about 185° F.) having an octane rating needing improvement. Also, the feedstock may contain sulfur largely in the form of organosulfur compounds, such as mercaptans, disulfides, thiophenes, and the like.

The process of the invention is preferably utilized in conjunction with a catalytic hydrotreating operation. That is, the feedstock to be subjected to desulfurization and isomerization or hydroisomerization in the process of the invention most usually comprises the effluent from a catalytic hydrotreater. In the hydrotreating process, the sulfur and nitrogen components in a hydrocarbon-containing liquid are converted by reaction with hydrogen at elevated temperatures and pressures to hydrogen sulfide and ammonia, respectively, in the presence of a hydrotreating catalyst usually comprising Group VIII and VIB metal components on a porous, essentially non-cracking refractory oxide, such as a sulfided catalyst containing nickel and/or cobalt components plus molybdenum and/or tungsten components on alumina. In a preferred method of operation, hydrotreating a feed containing a straight run gasoline will precede catalytic absorption of sulfur compounds and isomerization, and the feedstock most usually subjected to sulfur removal and isomerization in the process of the present invention will be the effluent from such a hydrotreating method after all or a portion of the hydrogen sulfide and ammonia have been removed. Such a hydrotreated feedstock typically contains organonitrogen compounds in a concentration less than about 10 ppmw, usually less than 1 ppmw, and preferably less than about 0.1 ppmw, calculated as N, and contains organosulfur compounds in a concentration less than about 30 ppmw, ideally zero, but usually at least about 0.01 ppmw, calculated as S. A typical concentration of organosulfur compounds is in the range about 0.05 to about 5 ppmw, preferably about 0 to about 2 ppmw, and most preferably in the range between 0 and 1 ppmw, calculated as S.

THE CATALYTIC ABSORBENT

Although the sulfur content of the feedstock may be reduced to the desired level by such desulfurization processes as caustic scrubbing, hydrodesulfurization and the like, the preferred process may employ a catalytic absorbent. The catalytic absorbent in the process must be capable of removing sulfur upon contact with a sulfur-containing fluid, particularly a liquid and/or gaseous hydrocarbon feedstock. The catalytic absorbent ordinarily contains one or more metal components supported on an amorphous, porous refractory oxide having sufficient surface area for absorption of sulfur impurities and preferably having essentially all pores of diameter greater than 20 angstroms. The absorbent may contain any metal capable of reacting with organosulfur compounds at an elevated temperature, e.g., about 600° F. The support material is usually a calcined, amorphous refractory oxide and generally contains no crystalline molecular sieve. The amorphous, porous refractory oxide support is typically calcined at a temperature greater than 500° F. and ordinarily greater than 800° F., prior to being employed in the method of the invention. Preferred amorphous, porous refractory oxide supports include alumina, silica, silica-alumina, zirconia, titania, boria, magnesia and combinations thereof. The most preferred support is gamma alumina having a surface area above 100 m²/gram. Typical metal components are copper, zinc, nickel, platinum, cobalt, iron and molybdenum, particularly in the oxide or reduced form. The most preferred metal components contain nickel or copper. Typical catalytic absorbents treated in the present invention are disclosed in U.S. Pat. Nos. 4,204,947, 4,582,819, and 4,336,130, which are herein incorporated by reference in their entireties.

A preferred catalytic absorbent of the invention is prepared by first comulling a copper component, such as copper (II) carbonate, or a nickel component, such as nickel carbonate, with alumina to form an extrudable paste, and then extruding the paste through a die and calcining the extrudate at a temperature greater than 700° F. to produce a copper-gamma alumina or nickel-gamma alumina extrudate having a circular cross-sectional diameter from about ¼ to about 1/20 inches, preferably about ⅛ inch, containing about 10 to about 80 weight percent of copper oxide, calculated as Cu, or about 10 to about 80 weight percent of nickel, calculated as Ni, and having essentially all pores of diameter greater than about 20 angstroms. The absorbent may also be prepared by aqueous impregnation if the copper or nickel compound, such as copper or nickel nitrate, is soluble in water. The surface area of the absorbent is about 100 to about 350 m²/gram, the compact bulk density is about 0.5 to about 0.9 grams/ml, and the crushing strength is about 5 to about 30 lbs/⅛ inch length. (Crushing strength in "lbs/⅛ inch length" is determined for an extrudate or other absorbent sample of cylindrical shape having a ⅛ inch length and a ⅛ inch diameter, using metal jaws having a width of ⅛ inch and with the force applied diametrically on the circumferential surface of the cylinder.)

THE DUAL-FUNCTION CATALYST

The invention provides for a "dual-function catalyst" simultaneously useful (1) in the removal of organosulfur compounds from a hydrocarbon oil in the liquid and/or gaseous phase and (2) in the production of a high yield of pentane and/or hexane isomer compounds from a hydrocarbon oil containing n-pentane and/or n-hexane. The dual-function catalyst contains at least one active Group VIII and Group VIB metal component combined with at least one acidic component. Preferably, the dual-function catalyst contains at least one nonnoble Group VIII active metal component, preferably a nickel metal component, and also contains at least one Group IB metal component, for example, a copper component. As will be shown hereinafter, the multimetal dual-function catalyst utilized in the present invention proves highly stable and superior for simultaneously isomerizing (or hydroisomerizing) and absorbing sulfur compounds from sulfur-containing feedstocks as compared to a dual-function catalyst containing a single active metal component on the acidic support.

The dual-function catalyst comprises an acidic component having sufficient acidity to impart activity for isomerizing a hydrocarbon feedstock, particularly a feedstock containing n-pentane and/or n-hexane. Suitable acidic components include silica-aluminas and crystalline molecular sieves having isomerizing activity. Crystalline molecular sieves are preferred acidic components. The term "crystalline molecular sieve" as used herein refers to any crystalline component which has sufficient activity for cracking or isomerization and is capable of separating atoms or molecules based on their respective dimensions. Crystalline molecular sieves may be zeolitic or nonzeolitic. The term "nonzeolitic" as used herein refers to molecular sieves whose frameworks are not formed of substantially only silica and alumina tetrahedra. The term "zeolitic" as used herein refers to molecular sieves whose frameworks are formed of substantially only silica and alumina tetrahedra such as the framework present in ZSM-5 type zeolites, Y zeolites, and X zeolites. Examples of zeolitic crystalline molecular sieves which can be used as an acidic component of the catalyst include Y zeolite, fluorided Y zeolites, X zeolites, zeolite beta, zeolite L, mordenite and zeolite omega. Examples of nonzeolitic crystalline molecular sieves which may be used as an acidic component of the catalyst include silicoaluminophosphates, aluminophosphates, ferrosilicates, titanium aluminosilicates, borosilicates and chromosilicates.

The most preferred zeolitic crystalline molecular sieves for the dual-function catalyst are crystalline aluminosilicate Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above 6.0. Thus, for purposes of this invention, a Y zeolite is one having the characteristic crystal structure of a Y zeolite, as indicated by the essential X-ray powder diffraction pattern of Y zeolite, and an overall silica-to-alumina mole ratio above 3.0, and includes Y-type zeolites having an overall silica-to-alumina mole ratio above about 6.0.

Typical Y zeolites in the sodium (or other alkali metal) form have few or no acid sites and, thus, have little or no cracking or isomerizing activity. The acidity of the Y zeolite may be increased by exchanging the sodium in the Y zeolite with ammonium ions, polyvalent metal cations, such as rare earth-containing cations, magnesium cations or calcium cations, or a combination of both, thereby lowering the sodium content. Such an ion-exchange may reduce the stability of the Y zeolite and (typically in the case of ammonium exchanges) the Y zeolite is then steam-treated at a high temperature (i.e., about 600° C. to about 800° C.) followed by further ion-exchange. For sufficient cracking or isomerizing activity, the sodium (or other alkali metal) content of the Y zeolite is generally reduced to less than about 1.0 weight percent, preferably less than about 0.5 weight percent and most preferably less than about 0.3 weight percent, calculated as $Na_2O$. Methods of carrying out the ion exchange are well known in the art.

A preferred Y zeolite for the dual-function catalyst is one prepared by first ammonium exchanging a Y zeolite to a sodium content between about 0.6 and 5 weight percent, calculated as $Na_2O$, calcining the ammonium exchanged zeolite in the presence of at least 0.2 p.s.i. water vapor partial pressure at a temperature between 600° F. and 1,650° F. to reduce the unit cell size to a value in the range between 24.40 and 24.64 Angstroms, and then ammonium exchanging the zeolite once again to replace at least 25 percent of the residual sodium ions and obtain a zeolite product of less than 1.0 weight percent sodium and preferably less than 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. A preferred member of this group is known as Y-82, a zeolitic aluminosilicate molecular sieve available from the Linde Division of the Union Carbide Corporation.

Another group of Y zeolites which may be used as a molecular sieve in the dual-function catalyst is comprised of zeolites normally having an overall silica-to-alumina mole ratio above about 6.0, preferably between about 6.1 and about 15. The zeolites of this group are prepared by dealuminating a Y-type zeolite having an overall silica-to-alumina mole ratio below about 6.0 and are described in detail in U.S. Pat. No. 4,503,023 issued to Breck et al., and European patent application No. 84104815.0 published on Nov. 7, 1984 as Publication No. 0 124 120 by Best et al., the disclosures of which are hereby incorporated by reference in their entireties. A preferred member of this group is known as LZ-210, a zeolitic aluminosilicate molecular sieve available from the Linde Division of the Union Carbide Corporation. LZ-210 zeolites and the other zeolites of this group are conveniently prepared from a Y zeolite starting material in overall silica-to-alumina mole ratios between about 6.0 and about 15, although higher ratios are possible.

LZ-210 zeolites contained in the dual-function catalyst have an overall silica-to-alumina mole ratio of greater than 6.0, and in contrast to Best et al. which discloses a ratio from 6.0 to 9.0, is preferably greater than 9.0 and most preferably greater than 11.0. Preferred ranges for the dual-function catalyst are from about 9.1 to about 15.0, and highly preferred from 11.0 to about 14.0. Typically, the unit cell size is at or below 24.65 Angstroms and will normally range between about 24.20 and about 24.65 Angstroms. LZ-210 zeolites having an overall silica-to-alumina mole ratio below 20 generally have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and −183° C. will be at least 25 weight percent. The LZ-210 class of zeolites have a composition expressed in terms of mole ratios of oxides as:

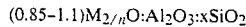
$(0.85-1.1)M_{2/n}O:Al_2O_3:xSiO_2$ wherein "M" is a cation having the valence "n" and "x" has a value greater than 6.0.

In general, LZ-210 zeolites may be prepared by dealuminating Y-type zeolites using an aqueous solution of a fluorosilicate salt, preferably a solution of ammonium hexafluorosilicate. The dealumination is accomplished by placing a Y zeolite, normally an ammonium exchanged Y zeolite, into an aqueous reaction medium such as an aqueous solution of ammonium acetate, and slowly adding an aqueous solution of ammonium fluorosilicate. After the reaction is allowed to proceed, a zeolite having an increased overall silica-to-alumina mole ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In some cases this product may be subjected to a steam calcination by contacting the product with water vapor at a partial pressure of at least 0.2 p.s.i.a. for a period of between about ¼ to about 3 hours at a temperature between about 900° F. and about 1,500° F. in order to provide greater crystalline stability.

In addition to the zeolitic crystalline molecular sieves disclosed herein and used in the Example, other examples of acidic components that may be combined with nickel or other active metals and their combinations include non-crystalline acidic materials such as silica-alumina or silica-alumina in an alumina dispersion. The latter is described in U.S. Pat. No. 4,097,365, the disclosure of which is incorporated by reference in its entirety.

An example of non-zeolite crystalline molecular sieves also useful as an acidic component in the dual-function catalyst is a silicoaluminophosphate, known by the acronym "SAPO," described in detail in U.S. Pat. No. 4,440,871, the disclosure of which is hereby incorporated by reference in its entirety. Another useful class of nonzeolitic crystalline molecular sieves is generally referred to as crystalline aluminophosphates, designated by the acronym "AlPO$_4$." The structure and preparation of the various species of aluminophosphates are discussed in U.S. Pat. Nos. 4,310,440 and 4,473,663, the disclosures of which are hereby incorporated by reference in their entirety. Yet another class of nonzeolitic molecular sieves suitable for use is known as ferrosilicates, designated by the acronym "FeSO." A preferred ferrosilicate denominated as FeSO-38 is disclosed in European patent application Nos. 83220068.0 filed on Oct. 12, 1982 and published on May 16, 1984 as Publication No. 0 108 271 A2, the disclosure of which application is hereby incorporated by reference in its entirety. Still other examples of nonzeolitic sieves include borosilicates, chromosilicates and crystalline silicas. Borosilicates are described in U.S. Pat. Nos. 4,254,247, 4,264,813 and 4,327,236, the disclosures of which are hereby incorporated by reference in their entireties. Chromosilicates are described in detail in U.S. Pat. No. 4,405,502, the disclosure of which is also hereby incorporated by reference in its entirety. A preferred crystalline silica, essentially free of aluminum and other Group IIIA metals, is a silica polymorph, i.e., silicalite, which may be prepared by methods described in U.S. Pat. No. 4,061,724, the disclosure of which is hereby incorporated by reference in its entirety.

In preparing the dual-function catalyst, the acidic component may be combined with a binder or matrix material comprising a porous, inorganic refractory oxide component having essentially no cracking or isomerizing activity, to produce support particulates. The acidic component is combined with the porous, inorganic refractory oxide component, or a precursor thereof, such as alumina, silica, titania, magnesia, zirconia, borilia, silica-magnesia, silica-titania, other such combinations and the like, with alumina being the most highly preferred. Examples of precursors that may be used include peptized alumina, alumina gel, hydrated alumina, hydrogels, and silica sols. Normally, the porous, inorganic refractory oxide component or its precursor is mixed or comulled with an acidic component in amounts such that the final dry catalyst mixture will comprise (1) between about 2.5 weight percent and about 95 weight percent acidic component, preferably between about 15 weight percent and about 80 weight percent, and (2) between about 5 weight percent and about 98 weight percent of porous, inorganic refractory oxide, preferably between about 10 weight percent and about 40 weight percent. The comulled mixture is then formed into particulates, usually by extrusion through a die having openings of a cross sectional size and shape desired in the final catalyst particles. For example, the die may have openings therein in the shape of three-leaf clovers so as to produce an extrudate material similar to that shown in FIGS. 8 and 8A of U.S. Pat. No. 4,028,227, the disclosure of which is hereby incorporated by reference in its entirety. Among preferred shapes for the die openings are those that result in particles having surface-to-volume ratios greater than about 100 reciprocal inches. After extrusion, the support particulates or the finished catalyst particles are cut into lengths of from 1/16 to ½ inch. The resulting particles are subjected to a calcination at an elevated temperature, normally between about 600° F. and about 1600° F., to produce support particulates or catalytic particles of high crushing strength.

The dual-function catalyst contains at least one Group VIII metal component, such as an oxide or free metal form thereof, typically in an amount from about 1 to about 40 weight percent, preferably between 10 and 25 weight percent, calculated as the monoxide. Suitable metal components are non-noble Group VIII metals such as nickel, cobalt and iron, with nickel being the most preferred non-noble Group VIII metal. The dual-function catalyst also contains one or more additional metal components, in particular, the metals or oxides of the Group IB metals, such as copper, and Group IIB metals, such as zinc and cadmium. The Group IB, IIB and non-noble Group VIII metals are most preferably employed in proportions each greater than 1.0 weight percent, and usually between about 5 and about 20 weight percent, calculated as the monoxide. Furthermore, when non-noble Group VIII and Group IB metals are present in combination on the catalyst, the catalyst preferably contains at least an equal weight percent, and more preferably, a greater weight percent of Group IB metal components, calculated as the monoxide, than that of the non-noble Group VIII components, calculated as the monoxide. When the metal components consist essentially of nickel and copper metal components, the nickel component is usually present in proportions sufficient to ensure that the catalyst contains between 1.0 and about 20 weight percent of the nickel component, calculated as NiO, and the copper component between about 5.0 weight percent and about 20 weight percent, calculated as CuO.

Although nickel, copper and the other metal components may be supplied from essentially any convenient source, the typical inorganic compounds for use herein include nickel nitrate, nickel acetate, nickel carbonate, nickel oxide, heptamcopper nitrate, copper carbonate, copper oxide, and the like. Organometallic compounds may be utilized such as cyclopentadienyl or carbonyl nickel or copper compounds.

The metal components may be impregnated into the extruded support particulates from a liquid solution containing the desired component. Another method of combining the metal components with the acidic component is by mulling or comulling the metal compounds with the acidic components and binding materials. In a preferred embodiment, the extruded and calcined support particulates containing acidic components are impregnated with an aqueous solution containing dissolved nickel and copper components.

The metals contained in the catalytic absorbent or dual-function catalyst, which will largely be present in their oxide forms after calcination in air, may be converted to their reduced forms, if desired, by contact at elevated temperatures in a reducing gas atmosphere comprising, for example, hydrogen. Most commonly, the reduction is accomplished by placing the absorbent or catalyst in its oxide form in the reactor vessel(s) wherein the isomerization and desulfurization reactions are to be performed and then passing gaseous hydrogen through the bed of materials under conditions of elevated temperature. The reducing agent may be present in the feedstock, or it may be a reducing gas added from an external source such as fresh or recycled hydrogen gas which has been stripped free of hydrogen sulfide. Alternatively still, the hydrogen may accompany the feedstock itself, as would be the case, for example, if the isomerization operation is performed immediately after hydrotreating. These and other equivalent methods for activating the catalytic absorbent or dual-function catalyst by conversion to the reduced form may be utilized in the invention.

An unusual feature of the multi-metal dual-function catalyst of the invention is stability of such a catalyst compared to a dual-function catalyst containing a single metal component on its support. The stability of the dual-function catalyst, as defined herein, is the decline in isomerization activity of the catalyst over time of contact of the catalyst with a feedstock at isomerization conditions. The more stable the catalyst, the lesser the degree or amount of decline of isomerization activity of the catalyst over time. In the present invention as seen hereinafter in Example II, a dual-function catalyst containing at least 1.0 weight percent of a Group VIII metal component, such as nickel, and at least 1.0 weight percent of a Group IB metal component, such as copper, is more stable than a dual-function catalyst containing essentially the same composition except not containing the copper component.

THE ISOMERIZATION CATALYST AND CONDITIONS FOR OPERATION

The isomerization catalyst employed in the process of the invention includes any catalyst having the property of promoting the isomerization or hydroisomerization of n-paraffins in a hydrocarbon feedstock, and more particularly the isomerization of n-pentane and/or n-hexane compounds. Typical isomerization catalysts contain a noble metal such as platinum and/or palladium on a cracking or acidic component as hereinbefore described. A preferred acidic component for the isomerization catalyst is a zeolitic crystalline molecular sieve such as hydrogen mordenite. A highly preferred isomerization catalyst contains platinum and hydrogen mordenite. Examples of useful isomerization or hydroisomerization catalysts are disclosed in U.S. Pat. Nos. 4,232,181 and 4,182,692 issued to Kiovsky et al., U.S. Pat. No. 3,925,503 issued to Parthasarathy, and U.S. Pat. No. 4,238,319 issued to Hauschildt et al., all of which are incorporated by reference in their entireties herein. Preferred isomerization catalysts include those promoting the isomerization reactions in the presence of added hydrogen (hydroisomerization) and particularly those catalysts promoting isomerization of a gaseous hydrocarbon feedstock.

The conditions employed to isomerize (or hydroisomerize) a hydrocarbon feedstock will vary depending upon the particular process embodiment in which the catalytic absorbent and/or dual-function catalyst and/or isomerization catalyst is used and the nature of the feedstock. Most usually, a fixed bed of the isomerization catalyst is contacted by the feedstock in a reactor operated at a temperature less than 650° F. and usually in the range from about 50° F. to about 600° F., preferably an elevated temperature from about 450° F. to about 550° F., and most preferably from about 480° F. to about 520° F. The feedstock passed to the isomerization catalyst may be in the liquid phase, but preferably is in the gaseous phase when it contacts the isomerization catalyst. Typical pressures maintained during such contacting are in the range from atmospheric to about 500 p.s.i.g., preferably less than about 400 p.s.i.g. and most preferably about 200 p.s.i.g. to about 350 p.s.i.g. The weight hourly space velocity (WHSV) of the feedstock over the isomerization catalyst is about 0.1 to about 5.0, preferably about 0.5 to about 3.0, and most preferably about 1.0 to about 2.0. In the presence of hydrogen, the hydrocarbon feed contacts the isomerization catalyst under hydroisomerization conditions wherein a hydrogen recycle rate of usually about 1,000 to about 8,000, and preferably about 1,500 to about 4,500 standard cubic feet per barrel (scf/bbl).

It has been observed that the activity of the isomerization catalyst for producing a hydrocarbon product of high octane quality from a feedstock containing normal paraffins, particularly n-pentane and/or n-hexane, is diminished in an unusual manner when the sulfur content of the feedstock is varied from 0 to 1, 1 to 2, or 2 to 5 ppmw of sulfur. As the feedstock sulfur content is increased from 0 to 1 ppmw, the isomerization activity of the catalyst decreases as evidenced by an increase in the n-hexane content of the product as well as by a decrease in the product octane, pentane isomer product, dimethyl butanes and methyl pentanes. In a typical situation wherein a feedstock consisting of an equimolar mixture of n-pentane and n-hexane is treated with the isomerization catalyst, the loss in activity is manifested by an increase in the mole percent of n-hexane product remaining from the total hexane product by 5.0 to 10.0 mole percent and by decreases in research octane number by 1.0 to 3.0 numbers. Also, the mole percent of pentane isomer product in the total pentane product is increased by 2.0 to 8.0 mole percent, the mole percent of dimethyl butane in the total hexane product by 1.0 to 3.0 mole percent, and the mole percent of methyl pentane in the total hexane product by 1.0 to 10.0 mole percent. An increase in the sulfur level from 1 to 2 ppmw results in an additional decline in activity of about the same magnitude as experienced when the sulfur level increases from 0 to 1 ppmw. A further increase in the amount of sulfur, from 2 to 5 ppmw, on the other hand, results in only a very small additional decline in activity. When the amount of sulfur in the feedstock is greater than 5 ppmw, little change has been observed in the activity. Clearly, it is the first 2 ppmw increment in sulfur that results in a major part of the activity decline. Such relationships between feedstock sulfur content and activity have been observed particularly at isomerization temperatures in the range from about 450° F. to about 575° F., and more particularly in the range from about 470° F. to about 520° F.

PROCESS EMBODIMENTS

In one embodiment of the invention, a liquid hydrocarbon feedstock containing greater than 2 ppmw, and usually greater than 5 ppmw of sulfur, calculated as S, and normal paraffins contacts a catalytic absorbent or dual-function catalyst in one or more upstream reaction zones under desulfurization conditions, e.g., sulfur-absorbing conditions including a temperature less than 650° F. and usually in the range from about 200° F. to about 600° F. and a pressure in the range from about 100 p.s.i.g. to about 750 p.s.i.g. and a space velocity of about 0.1 to about 5.0 (WHSV). The feedstock contacts the catalytic absorbent or dual-function catalyst in either the liquid or gaseous phase and in the presence or absence of hydrogen, depending upon which environment is most effective for sulfur removal by the particular active metal components in the absorbent or catalyst at the conditions of sulfur removal. The effluent from the upstream reaction zone(s) contains sulfur in a concentration less than 5 ppmw, preferably less than 2 ppmw of sulfur, and more preferably in the range from 0-1 ppmw, and most preferably nil; i.e., less than 0.1 ppmw, calculated as S. Hydrogen is usually added to the effluent (if not already present in sufficient amount) and the effluent then passed over an isomerization (hydroisomerization) catalyst in at least one downstream reaction zone at isomerization (hydroisomerization) conditions including a temperature in the range from about 450° F. to about 575° F. Due to the isomerization (hydroisomerization) reactions, the product hydrocarbon obtained from the downstream reaction zone(s) contains a reduced concentration of normal paraffins and an increased concentration of isomerized paraffin compounds. More particularly, when the feedstock contains n-pentane and n-hexane compounds, the reactions in the isomerization (hydroisomerization) zone yield product hydrocarbons containing a reduced amount of n-pentane and n-hexane, usually at least about 30 percent reduction of at least one, and an increased amount of pentane isomers (such as methyl butane and neopentane) and/or hexane isomers (such as dimethyl butanes and methyl pentanes). Such yields of isomers are usually at least about 1.2 times higher, and in some cases higher by a factor of two, than yields obtained from a process wherein essentially the same hydrocarbon feedstock contacts the isomerization catalyst without benefit of sulfur removal in the upstream reaction zones(s) containing the catalytic absorbent or dual-function catalyst.

In a modified process of the preceding embodiment, it is preferred that the operating conditions in both the upstream and downstream reaction zones be essentially equivalent and that the contacting with the catalytic absorbent or dual-function catalyst in the upstream reaction zone and contacting the hydroisomerization catalyst in the downstream reaction zone(s) be in the gaseous phase. Accordingly, operating conditions in both the upstream and downstream reaction zones are those disclosed hereinbefore for the bed of isomerization catalyst, i.e., a temperature in the range from about 450° F. to about 550° F., a pressure in the range from about 200 p.s.i.g. to about 350.p.s.i.g., a space velocity in the range from about 0.5 to about 3.0 WHSV, and the presence of hydrogen. Such a scheme eliminates the need for heat-exchange means between the upstream and downstream reaction zone(s) in order to provide a gaseous effluent to the downstream reaction zone. Furthermore, when the dual-function catalyst is employed in the upstream reaction zone(s), the conditions must be such that isomerization occurs in both the upstream and downstream reaction zones.

In the modified process just described, the dual-function catalyst is employed in the upstream reaction zone(s) so as to simultaneously absorb sulfur compounds and isomerize the feedstock. The effluent from the upstream reaction zone(s), in addition to containing less than 1 ppmw and preferably essentially no sulfur, also contains an increased amount of pentane isomers and/or hexane isomers as compared to that in the feedstock. Such isomerization in the upstream reaction zone(s) supplements the isomerization in the downstream reaction zone(s) to yield a product hydrocarbon from the overall process (i.e., effluent from the downstream reaction zone(s)) that contains essentially no sulfur, a reduced content of n-pentane and n-hexane, and an increased amount of pentane and hexane isomers.

Although a typical flow scheme involves successively passing a hydrocarbon feedstock through at least one sulfur absorption reactor containing a catalytic absorbent and subsequently through at least one isomerization reactor containing the isomerization catalyst, the process of the invention is not limited to this particular flow scheme. For example, in one embodiment of the invention, two or more separate reaction zones may be utilized in series in one reactor, with at least one upstream reaction zone containing the catalytic absorbent and at least one downstream reaction zone containing the dual-function catalyst. Furthermore, the dual-function catalyst can be utilized alone in one or more reaction zones at isomerization conditions disclosed hereinbefore. In this latter embodiment the feedstock usually contains less than 5 ppmw, preferably less than 2 ppmw and most preferably in the range from 0-1 ppmw of sulfur, calculated as S.

The invention is further illustrated by the following examples which are illustrative of specific modes of practicing the invention and are not intended as limiting the scope of the invention defined by the appended claims.

EXAMPLE I

A conventional isomerization catalyst designated as "HS-10" and commerically available from the Linde Division of the Union Carbide Corporation is contacted in 7 separate runs with a hydrocarbon feedstock consisting of equimolar mixture of n-pentane and n-hexane and doped with thiophene in concentrations varied as hereinafter described.

During start-up of the process, hydrogen gas contacts the isomerization catalyst for 4 hours at 300° C. and the feedstock contacts the isomerization catalyst in the presence of hydrogen in a stainless steel reactor (designated as R-2 herein) in each run for 24 hours under the conditions in Table I:

TABLE I

| | |
|---|---|
| Temperature | 250° C. |
| Pressure | 300 p.s.i.g. |
| Space Velocity | 3.0/hr WHSV |
| Hydrogen/Feedstock | 4/1 molar |

In run numbers 2 and 3 a catalytic absorbent, designated as Catalyst A (containing a nominal 20 weight percent of copper oxide, calculated as CuO, on gamma alumina), is contacted with the feedstock in an upstream separate stainless steel reactor (designated as R-1 herein) under the above mentioned conditions in Table I. In these runs the feedstock is passed serially over the materials in R-1 and R-2 and the effluent from R-1 analyzed for sulfur content and the effluent from R-2 analyzed for octane rating and for the products set forth in Table II:

TABLE II

| R-2 Hydrocarbon Products | |
|---|---|
| i-C$_5$ | mole percent of pentane isomer product in the total pentane product |
| DMB | mole percent of dimethyl butane product in the total hexane product |
| MP | mole percent of methyl pentane in the total hexane product |
| n-C$_6$ | mole percent of n-hexane product remaining from the total hexane product |

TABLE II-continued

| R-2 Hydrocarbon Products | |
|---|---|
| RONC | calculated research octane number of the C$_5$ + isomers in the product |

In runs 6 and 7, R-1 contains Catalyst DF, a dual-function catalyst containing a nominal 15.0 weight percent of nickel oxide, calculated as NiO, 68 weight percent of LZ-210 zeolite (having a silica-to-alumina ratio of 9.0), and 17 weight percent of alumina. Catalyst DF is prepared by comulling the LZ-210 zeolite with sufficient alumina hydrogel. The comulled paste is extruded in particulate form having a cross-sectional cylindrical shape. The particulates are of a length between about ¼ and ½ inch, are dried and calcined in air. The extrudates are then impregnated with sufficient aqueous solution of nickel nitrate. In runs 8 and 9, Catalyst DF is contacted with the feedstock in R-2.

The following Table III summarizes (1) the sulfur content of the feedstock (doped with n-butyl mercaptan) or effluent from R-1 for each run and (2) the isomerized products and octane values obtained from the effluent of R-2. Note that in runs 1, 4, 5, 8 and 9, the feedstock is passed through only one reactor vessel, R-2, and contacts either the catalytic absorbent or dual-function catalyst as shown in Table III.

TABLE III

| | Feedstock Sulfur, ppmw S | | | | | | | | |
|---|---|---|---|---|---|---|---|---|---|
| Run No. | Feedstock to R-1 | Catalytic Absorbent in R-1 | Effluent from R-1 that passes to R-2 | Feedstock to R-2 | Isomerization Catalyst in R-2 | | R-2 Product Analysis | | |
| | | | | | | I—C$_5$ | DMB | MP | n-C$_6$ RONC |
| 1 | — | — | — | 0 | HS-10 | 15.0 | 3.4 | 43.2 | 53.4  56.6 |
| 2 | 0 | Cat. A | 0 | — | HS-10 | 15.7 | 3.9 | 40.7 | 55.4  56.7 |
| 3 | 5 | Cat. A | 0 | — | HS-10 | 15.7 | 3.9 | 39.8 | 56.9  56.2 |
| 4 | — | — | — | 5 | HS-10 | 7.9 | 2.8 | 18.0 | 79.2  49.4 |
| 5 | — | — | — | 100 | HS-10 | 9.7 | 3.6 | 20.9 | 75.4  50.6 |
| 6 | 0 | Cat. DF | 0 | — | HS-10 | 34.8 | 13.3 | 62.3 | 24.3  68.3 |
| 7 | 100 | Cat. DF | 0 | — | HS-10 | 31.2 | 9.6 | 60.6 | 29.8  66. |
| 8 | — | — | — | 0 | Cat. DF | 12.0 | 4.0 | 45.6 | 50.4  57.0 |
| 9 | — | — | — | 100 | Cat. DF | 10.1 | 2.8 | 36.0 | 61.1  53.8 |

— not applicable

The data in Table III demonstrate that in run no. 4, 5 ppmw of sulfur causes a substantial decline in isomer product yields as compared to the yields in run nos. 1, 2 and 3 from the sulfur-free feedstocks. The process of the invention in run no. 3 provides a sulfur-free feedstock contacting the isomerization catalyst and results in isomerization products of essentially the same yields as in run nos. 1 and 2 wherein the sulfur-free feedstocks also contact the isomerization catalyst.

In run no. 5, a feedstock containing 100 ppmw of sulfur contacting the isomerization catalyst in R-2 also causes substantial decline in the activity of the isomerization catalyst as compared to that when a sulfur-free feedstock contacts the catalyst (see run nos. 1-3). However, when the dual-function Catalyst DF is utilized in the upstream reactor, R-1, in the process of the invention (run nos. 6 and 7), a substantial increase in isomerization results in the products from R-2 as compared to that in run no. 5. Such an increase in isomerization occurs when 0 or 100 ppmw of sulfur are contained in the feedstock supplied to R-1. It is clearly shown in run no. 7 that the dual-function catalyst provides substantial desulfurization.

Furthermore, the dual-function catalyst (run nos. 6 and 7) also provides substantial isomerization. In runs nos. 6 and 7 the mole percent of pentane isomer product (i-C$_5$) is more than doubled and the mole percent of n-hexane product remaining (n-C$_6$) is essentially reduced by at least a factor of two, when compared against run nos. 1–3 wherein sulfur-free feedstocks also contact the isomerization catalyst in R-2. Thus, isomerization occurs in both R-1 and R-2 in run nos. 6 and 7 whereas in run nos. 1–3 isomerization only occurs in R-2.

In run nos. 8 and 9 wherein the dual-function Catalyst DF is employed in R-2 as the only catalyst in the process, the yield of isomerization products is at least equivalent, or in the case of n-hexane isomerization, substantially greater than that in respective run nos. 1 and 5. In the comparison of run no. 8 with run no. 1, both the isomerization catalyst, HS-10, and the dual-function catalyst are contacted with the sulfur-free feedstock to produce similar yields of isomerized products. However, when the feedstock is doped with 100 ppmw of sulfur in run nos. 9 and 5, the process of the invention (employing Catalyst DF in run no. 9) produces a substantially increased yield of isomerized hexane compounds and improved product octane compared to run no. 5 employing the conventional catalyst. Catalyst DF is clearly more sulfur tolerant than Catalyst HS-10.

EXAMPLE II

Two catalysts, one designated as "DFNi" and the other as "DFCu/Ni" are prepared in a similar manner to Catalyst DF of Example I, except Catalyst DFNi contains a nominal 11.0 weight percent of nickel oxide, calculated as NiO, and Catalyst DFCu/Ni contains a nominal 11.0 weight percent of nickel oxide (as NiO) and 8.1 weight percent of copper (II) oxide, calculated as CuO, with both catalysts having the balance of the composition with a support containing LZ-210 zeolite (having a silica-to-alumina ratio of 12.0) in an 80/20 weight ratio to alumina.

Each catalyst is contacted in the R-2 reactor of Example I in separate 70-hour runs with the hydrocarbon feedstock of Example I, doped with thiophene to an initial concentration of 15 ppmw, calculated as S. The catalysts are initially contacted with hydrogen gas for 48 hours at 375° C. and 300 p.s.i.g. and then contacted by the feedstock under the same conditions as Example I for 70 hours, except the temperature is increased to 270° C. for the run employing Catalyst DFNi and to 285° C. for the run employing Catalyst DFCu/Ni, the initial temperatures being selected to provide each catalyst with the same initial isomerization activity for each run.

In accordance with the same designations as indicated for the R-2 hydrocarbon products in Table II of Example I, the following Table IV summarizes the isomerized products obtained from the effluent of each run. Throughout each run the effluent is observed to have a nil sulfur concentration.

TABLE IV

| Run length, hrs. | i-C$_5$ DFNi | i-C$_5$ DFCu/Ni | DMB DFNi | DMB DFCu/Ni | MP DFNi | MP DFCu/Ni | n-C$_6$ DFNi | n-C$_6$ DFCu/Ni |
|---|---|---|---|---|---|---|---|---|
| 20 | 36.0 | 37.5 | 19.0 | 19.0 | 60.0 | 60.0 | 21.0 | 21.0 |
| 30 | 33.0 | 35.0 | 18.0 | 19.0 | 60.0 | 60.0 | 23.5 | 22.5 |
| 40 | 27.5 | 32.5 | 14.0 | 17.5 | 58.0 | 60.0 | 27.0 | 23.5 |
| 50 | 23.0 | 31.0 | 11.5 | 16.0 | 57.0 | 59.5 | 32.0 | 24.5 |
| 60 | 18.0 | 27.5 | 7.5 | 14.0 | 51.5 | 58.0 | 41.0 | 27.0 |
| 70 | 12.5 | 25.0 | 5.5 | 13.0 | 43.0 | 57.5 | 55.0 | 30.0 |

The data in Table IV demonstrate that the Catalyst DFCu/Ni has much more isomerization stability than Catalyst DFNi over the course of each run. For example, the decrease in the mole percent of pentane isomer product in the total pentane product (i-C$_5$) over the last 50 hours of each 70 hour run is only about 12.5 mole percent (37.5-25.0) for the nickel/copper containing catalyst compared to about twice that amount, i.e., 23.5 mole percent, (36.0-12.5) for the nickel-only catalyst. Also, the decreases in the mole percentage of methyl pentane (MP) and dimethyl butane (DMB) product and the increases in the mole percentages of the normal hexane (n-C$_6$) product over each run are much less sharp for the nickel/copper catalysts than for the nickel-only catalyst.

In view of the foregoing description of the invention including the Examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

We claim:

1. A catalytic composition consisting essentially of greater than about 1.0 weight percent of at least one nickel component, calculated as NiO, greater than about 1.0 weight percent of at least one copper component, calculated as CuO, and an acidic component containing a crystalline molecular sieve having cracking activity.

2. The composition defined in claim 1 wherein said crystalline molecular sieve is zeolitic and is selected from the group consisting of ZSM-5 catalyst, Y zeolites, X zeolites, zeolite beta, mordenite, zeolite L and zeolite omega, said nickel component comprises greater than 1 to about 20 weight percent, calculated as NiO, and said copper component comprises greater than 5 to about 20 weight percent, calculated as CuO.

3. The composition defined in claim 2 wherein said acidic component is a Y zeolite.

4. The composition defined in claim 3 wherein said Y zeolite contains a mole ratio of oxides according to the formula $(0.85\text{-}1.1)M_{2/n}O:Al_2O_3:xSiO_2$ wherein M is a cation having the valence n and x has a value greater than 6.0.

5. The composition defined in claim 4 wherein said Y zeolite is prepared by dealuminating a Y zeolite having an overall silica-to-alumina mole ratio below about 6.0 using an aqueous solution of a fluorosilicate salt.

6. The composition defined in claim 3 wherein said Y zeolite is prepared by a method comprising the steps of:
   (1) calcining an ammonium-exchanged zeolite Y containing between about 0.6 and 5 weight percent sodium, calculated as Na$_2$O at a temperature between about 600° F. and 1650° F. in contact with water vapor for a sufficient time to substantially reduce the unit cell size of said zeolite and bring it to a value between about 24.40 and 24.64 angstroms; and (2) subjecting the calcined zeolite to further ammonium ion exchange under conditions such that the sodium content of the zeolite is reduced below about 0.6 weight percent, calculated as $Na_2O$.

7. The composition defined in claim 1 wherein said acidic component is a nonzeolitic crystalline molecular sieve selected from the group consisting of silicoaluminophosphates, aluminophosphates, ferrosilicates, borosilicates and chromosilicates.

8. A catalytic composition consisting essentially of greater than 1 weight percent of a nickel metal component, calculated as NiO, and greater than about 5 weight percent of a copper metal component, calculated as CuO, in combination with an acidic component having cracking activity.

9. The composition defined in claim 8 wherein said acidic component is a crystalline molecular sieve.

10. The composition defined in claim 8 wherein said nickel component comprises greater than about 1 to less than about 20 weight percent, and said copper component comprises greater than about 5 to less than about 20 weight percent.

11. The composition defined in claim 9 wherein said crystalline molecular sieve is zeolitic and is selected from the group consisting of ZSM-5 catalyst, Y zeolites, X zeolites, zeolite beta, mordenite, zeolite L and zeolite omega.

12. The composition defined in claim 11 wherein said acidic component is a Y zeolite.

13. The composition defined in claim 12 wherein said Y zeolite contains a mole ratio of oxides according to the formula $(0.85-1.1)M_{2/n}O:Al_2O_3:xSiO_2$ wherein M is a cation having the valence n and x has a value greater than 6.0.

14. The composition defined in claim 13 wherein said Y zeolite is prepared by dealuminating a Y zeolite having an overall silica-to-alumina mole ratio below about 6.0 using an aqueous solution of a fluorosilicate salt.

15. The composition defined in claim 11 wherein said Y zeolite is prepared by a method comprising the steps of:

(1) calcining an ammonium-exchanged zeolite Y containing between about 0.6 and 5 weight percent sodium, calculated as $Na_2O$ at a temperature between about 600° F. and 1650° F. in contact with water vapor for a sufficient time to substantially reduce the unit cell size of said zeolite and bring it to a value between about 24.40 and 24.64 angstroms; and (2) subjecting the calcined zeolite to further ammonium ion exchange under conditions such that the sodium content of the zeolite is reduced below about 0.6 weight percent, calculated as $Na_2O$.

16. The composition defined in claim 8 wherein said acidic component is a nonzeolitic crystalline molecular sieve selected from the group consisting of silicoaluminophosphates, aluminophosphates, ferrosilicates, borosilicates and chromosilicates.

17. A catalytic composition consisting essentially of about 1 to about 20 weight percent of a nickel metal component, calculated as NiO, and about 1 to about 20 weight percent of a copper metal component, calculated as CuO, in combination with a Y zeolite containing a mole ratio of oxides according to the formula $(0.85-1.1)M_{2/n}O:Al_2O_3:xSiO_2$ wherein M is a cation having the valence n and x has a value greater than 9.0.

18. The composition defined in claim 17 wherein said Y zeolite is prepared by dealuminating a Y zeolite having an overall silica-to-alumina mole ratio below about 6.0 using an aqueous solution of a fluorosilicate salt.

19. The composition defined in claim 17 wherein x has a value from about 11.0 to about 14.0.

20. A catalytic composition consisting essentially of greater than 1 weight percent of a non-noble Group VIII metal component, calculated as the monoxide, and greater than about 1 weight percent of a Group IB metal component, calculated as the monoxide, in combination with an acidic component having cracking activity.

21. The composition defined in claim 20 wherein said acidic component is a crystalline molecular sieve.

* * * * *